US009342091B2

(12) United States Patent
Wuisan et al.

(10) Patent No.: US 9,342,091 B2
(45) Date of Patent: May 17, 2016

(54) MULTI-FUNCTION CONTROL GRIP FOR WORK VEHICLES

(71) Applicant: DEERE & COMPANY, Moline, IL (US)

(72) Inventors: Giovanni A. Wuisan, Epworth, IA (US); Daniel R. Klein, Peosta, IA (US); Joseph F. Tilp, Dubuque, IA (US)

(73) Assignee: Deere & Company, Moline, IL (US)

( * ) Notice: Subject to any disclaimer, the term of this patent is extended or adjusted under 35 U.S.C. 154(b) by 77 days.

(21) Appl. No.: 14/196,884

(22) Filed: Mar. 4, 2014

(65) Prior Publication Data

US 2015/0253801 A1 Sep. 10, 2015

(51) Int. Cl.
*G05G 1/04* (2006.01)
*G05G 1/01* (2008.04)
(Continued)

(52) U.S. Cl.
CPC *G05G 1/06* (2013.01); *E02F 3/435* (2013.01); *G05G 1/01* (2013.01); *G05G 1/04* (2013.01);
(Continued)

(58) Field of Classification Search
CPC ............. G05G 1/58; G05G 1/62; G05G 1/06; G05G 1/04; G05G 1/01; G05G 1/00; G05G 11/00; G05G 13/00; E02F 9/2004; E02F 3/43; E02F 3/435; Y10T 74/20732; B64C 13/12; H01H 9/06; H01H 2009/066; B66F 9/20; B66F 9/0759
USPC ............... 74/491, 479.01; 180/333; D12/174; 187/224
See application file for complete search history.

(56) References Cited

U.S. PATENT DOCUMENTS 3,573,412 A * 4/1971 Uhrich .................... G05G 9/04
200/329
3,823,616 A * 7/1974 Houseman ................ B66F 9/20
180/65.1
(Continued)

FOREIGN PATENT DOCUMENTS

GB 2256916 A * 12/1992 ............... B62D 1/04
JP 63-216116 A * 9/1988 ............... G05G 1/06
(Continued)

OTHER PUBLICATIONS

Elobau Fingertrip Joystick, http://www.elobau.com/Vehicle_Components/Joystick_base_and_Joystick_handle/Joystick_base_uniaxial/0,0,0,406,115.html&SETSPRACHE=8, Admitted Prior Art.
(Continued)

*Primary Examiner* — Keith Frisby
(74) *Attorney, Agent, or Firm* — Ingrassia, Fisher & Lorenz PC

(57) ABSTRACT

A control grip is disclosed for off-road vehicles that functions as a combined stabilizing support and multi-function implement control device for the vehicle operator. The control grip includes a structural frame providing a mounting base with upright supports for a grab bar. The control grip mounts various control switches, which can vary in quantity, configuration, position and function depending on the work vehicle type. In one configuration, a pair of control switches are mounted at the distal end of the control grip, one switch positioned for manipulation by the operator's thumb for controlling a first range of motion of the implement, and a second switch positioned to be manipulated by the operator's thumb and/or index finger for controlling the implement's second range of motion. The control switch placement enables the operator to actuate one or both of the switches while maintaining a firm grip on the grab bar during operation.

18 Claims, 9 Drawing Sheets

(51) Int. Cl.
*G05G 11/00* (2006.01)
*E02F 3/43* (2006.01)
*G05G 1/06* (2006.01)
*E02F 9/20* (2006.01)

(52) U.S. Cl.
CPC ............... *G05G 11/00* (2013.01); *E02F 9/2004* (2013.01); *Y10T 74/20207* (2015.01); *Y10T 74/20396* (2015.01)

(56) References Cited

U.S. PATENT DOCUMENTS

| | | | | | |
|---|---|---|---|---|---|
| 3,941,009 | A * | 3/1976 | Brown | F16H 59/02 200/61.88 |
| 4,982,189 | A * | 1/1991 | Dammeyer | H03M 1/308 341/16 |
| 5,002,454 | A | 3/1991 | Hadank et al. | |
| 5,591,082 | A * | 1/1997 | Jensen | A63F 13/06 244/234 |
| 5,768,947 | A | 6/1998 | Fee et al. | |
| 7,497,298 | B2 | 3/2009 | Shearer et al. | |
| 7,823,685 | B2 | 11/2010 | Blind | |
| 2006/0243517 | A1* | 11/2006 | Lohmann | B62B 5/06 180/333 |

FOREIGN PATENT DOCUMENTS

| | | | | |
|---|---|---|---|---|
| JP | 08-081197 | A * | 3/1996 | B66F 9/20 |
| JP | 11-338568 | A * | 12/1999 | G05G 1/04 |

OTHER PUBLICATIONS

Caterpillar D8T Track-Type Tractor, 2007.
Deere & Company, John Deere 700K/750K/850K Dozers Brochure, Aug. 7, 2013.
Deere & Company, John Deere K-Series Backhoes Brochure, Oct. 2012.
Deere & Company, John Deere G/GP-Series Graders Brochure, Nov. 2013.
Deere & Company, John Deere 950J/1050J Dozers Brochure, May 2012.

* cited by examiner

MULTI-FUNCTION CONTROL GRIP FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and in particular to operator controls for work implements.

BACKGROUND OF THE DISCLOSURE

Work vehicles, such as those used in the agricultural, construction and forestry industries, often have work implement attachments, such as buckets, rippers, scrapers and the like, used for operations such as grading, excavating, tilling, and general site preparation. Conventional work vehicles are equipped with some type of operator control, for example, various hand controls, switches, levers and joysticks for controlling the movements of these implements. The operator uses such controls to control the movements of the implements. For example, in the case of a ripper attachment, the operator can control the height and pitch of the ripper, and for a scraper, the scraper bowl opening, the ejector position, and the depth of the scraper blade.

The off-road environments often encountered by such work vehicles can be extremely rough, especially in tracked vehicles, thus making the operation of the attachment component difficult for the vehicle operator. The operator is often required to make fine adjustments in the positioning of the controls in order to accurately articulate the associated implement, all while being shaken or jostled about within the cab. Fine adjustments can be particularly difficult without sufficient hand support. Moreover, conventional multi-function controls require the operator to be able to manipulate numerous switches or buttons while positioning the control.

Some work vehicles, for example, use a dual-axis joystick to control the various movements of the work implement. However, conventional dual-axis joysticks generally do not stabilize the operator when operating the work vehicle in rough conditions. This can lead to unstable operator positioning as well as unintended movement of the joystick. Other conventional controls for work implements include multiple switches that are difficult to reach or manipulate simultaneously, and thus these controls suffer from similar shortcomings in control functionality and operator stability, particularly in rough operating conditions.

U.S. Pat. No. 5,768,947 discloses one example of an operator control device for use in an off-road vehicle. In particular, this patent discloses an operator control device for a tracked vehicle having a ripper attachment. The device provides a hand support in the form of an upwardly canted cantilevered hand grip. At the end of the hand grip is a rotatable thumb lever. The thumb lever is mounted to a rotating shaft running through the core of the hand grip, which interacts with one or more position sensors inside the device. The sensors cooperate with other control electronics to, linearly and non-linearly, control the ripper hydraulic control valve(s) necessary to control the vertical position of the ripper. One significant disadvantage of the disclosed control device is that to control the ripper pitch (i.e., the fore and aft movement of the ripper teeth), the operator must manipulate a second lever mounted to the base of the device, off of the hand grip itself. Thus, in order to fully control the implement, the operator must manipulate both, at times simultaneously, both a hand grip mounted switch and a base mounted switch. Moreover, the pitch adjustment is another rotational input, which given the location and switch mechanism disclosed, may require the operator to use two fingers, such as index and middle fingers, to maneuver the ripper teeth in the desired fore and aft position. The extra digits required to manipulate the controls diminishes the operator's grip on the hand grip, which can cause operator instability and compromise control precision.

SUMMARY OF THE DISCLOSURE

This disclosure provides an improved control grip for off-road vehicles that functions as a combined stabilizing support and multi-function implement control device for the vehicle operator. The control grip includes a structural mounting base with one or more upright supports for mounting a grab bar. The control grip mounts various control switches, which can vary in quantity, position and function depending on the work vehicle type. The control grip can assist a vehicle operator to precisely control the implement during rough operating conditions since the switch placement enables the operator to actuate one or more of the switches while maintaining a firm grip on the grab bar at all times. The configuration of the control grip and the placement of the control switches can also allow the operator to control multiple movements of one or more actuators or implements simultaneously or sequentially using only a single digit of the hand (e.g., thumb or finger), thereby leaving up to four other digits of the hand available to firmly grasp the control grip for stabilizing the operator.

In one aspect, the disclosure provides a control grip for controlling the operation of an implement attached to a work vehicle. A grab bar, configured to be grasped by a human hand, extends between a proximal end of the control grip and a distal end of the control grip. A base has at least one upright support at least one of the proximal and distal ends of the control grip so as to support the grab bar in spaced relation to a mounting surface to which the base is mounted. First and second control switches are connected to at least one of the grab bar and the upright support at the distal end of the control grip. The second control switch is arranged in an orientation different from the first control switch.

In another aspect, the disclosure provides a control grip having a rigid support frame defining a mounting platform and spaced-apart uprights spanned by a grab bar spaced above the mounting platform and supported at opposite ends by the uprights. The support frame includes at least one switch mount located at one of the uprights. First and second control switches are mounted to the at least one switch mount in different orientations. An outer body is mounted to the support frame, at least along the grab bar configured to be grasped by a human hand.

In yet another aspect, the disclosure provides a control grip for controlling the operation of an implement attached to a work vehicle and movable in at least first and second ranges of movement. The control grip has a base with a mounting platform and a pair of proximal and distal upright supports. A grab bar extends between the proximal and distal upright supports and is spaced from the mounting platform. Each of the first and second switch levers is connected to the distal end upright support spaced from the mounting platform and pivotal about separate pivot axes in two opposite directions. The second pivot axis can extend in a reference plane perpendicular to a reference plane containing the first pivot axis. Pivoting the first switch lever about the first pivot axis in a first direction is configured to move the implement in one direction of the first range of motion, and pivoting the first switch lever about the first pivot axis in a second direction is configured to move the implement in an opposite direction of the first range of motion. Pivoting the second switch lever about the second pivot axis in a third direction is configured to move the implement in one direction of the second range of motion, and pivoting the second switch lever about the second pivot axis in a fourth direction is configured to move the implement in an opposite direction of the second range of motion.

A work vehicle, and control system incorporated into a work vehicle, having the work implement and control grip as described above is also disclosed. Still other features of the control grip, control system and work vehicle will be apparent from the following description and accompanying drawings.

DETAILED DESCRIPTION

Figure 1:
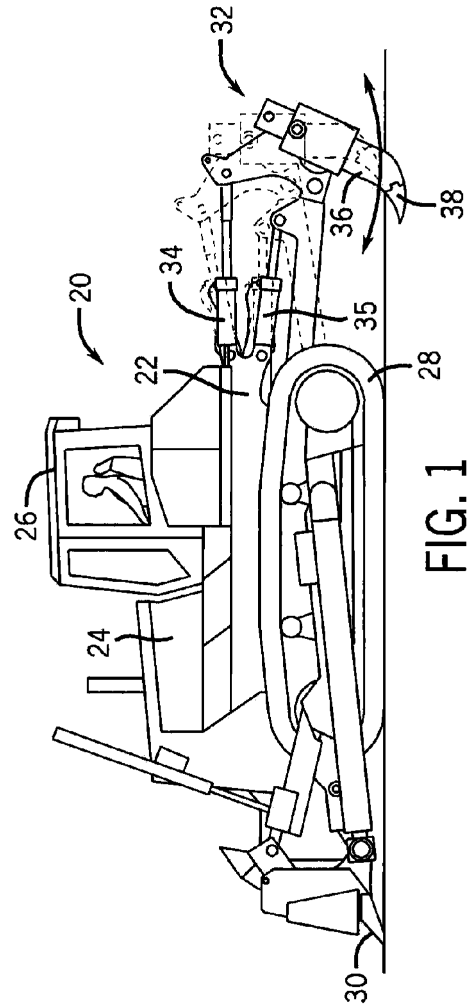
FIG. 1 is a side view of an example work vehicle, in the form of a dozer machine having a ripper attachment, in which one example of the disclosed control grip may be implemented.

The following describes one or more example constructions of a control grip, and control schemes therefor, such as shown in the accompanying figures of the drawings described briefly above. Various modifications to the described examples may be contemplated by one of skill in the art.

In certain situations it may be useful to provide a control grip, or control system or work vehicle that has such a control grip, that serves the dual functions of an implement control and a stabilizer for the vehicle operator. Thus, for example, it may be advantageous to provide the control grip that bolts or otherwise securely mounts to the vehicle, such as onto a console in the operator cabin within a comfortable reach of the operator seat. In particular, it may be beneficial to have the control grip configured so that the operator can maintain a firm grip while manipulating one or more controls (e.g., switches, buttons, etc.) used to articulate the work implement. In this way, the control grip simultaneously helps to stabilize the operator as well as allow the operator to manipulate the controls, and thereby the implement, accurately and precisely. This is particularly significant when the vehicle is operating on rough terrain and the implement being controlled or the environment being worked requires fine movements in order to complete the work operation. This disclosure provides a control grip, and implement control system, with these and other features.

In certain embodiments, the disclosed control grip can have a composite construction with a structural internal frame covered, at least in part, by a generally non-structural outer body or housing for aesthetics, comfort and/or even additional structural rigidity. In this case, for example, the control grip can have an internal skeleton of steel plate and/or tube covered by an outer body of plastic, such as a polyurethane casting. Alternatively, the handle area, or even the entire control grip, can be formed as one piece (i.e., without an internal frame), such as using an injection molding technique and a robust resin, such as a suitable ABS or glass-filled nylon material. Thus, either with the internal frame or the solid-core construction, the control grip is constructed to be sufficiently strong to withstand the grip and push-pull forces applied by an operator for stabilizing purposes during operation of the vehicle on rough terrain. Moreover, the handle or grip area can be of an ergonomic size and shape, and in certain embodiments may have a relatively soft or compliant outer surface or construction to improve the comfort experience of the operator.

As will be described in detail below, in one example configuration, the control grip can have a pair of upright supports between which spans a grab bar. The grab bar can provide the ergonomic handle, as described, and the uprights can support the grab bar from the mounting surface of the vehicle, for example to provide adequate finger space between the grab bar and the mounting surface and to set the proper mounting height and angular orientation of the control grip relative to the operator seat and/or console.

In some embodiments the control grip can be a multi-functional control with multiple controls for actuating multiple positioning (or other) actuators of the implement. Moreover, the controls can be located and oriented at a position within close reach of the thumb and fingers of the operator's hand that grasps the grab bar. In certain embodiments, one or more implement control switches can be mounted to the control grip, such as at or near the upright support or grab bar at a forward or distal end of the control grip. In this way, the operator can manipulate one or more control switches while maintaining a firm grasp with one, two, three or even four fingers. With the control switches in close proximity to each other, simultaneous actuation of multiple switches can also be achieved while maintaining a firm, multi-finger grip of the grab bar.

In addition, in some configurations, the control grip can be constructed as a single platform that can support various switch mounting arrangements, and thereby provide controls for various implements, moveable in one, two, three or more ranges of motion. Furthermore, in various embodiments, the control grip can be provided with control switches of a type and mounting orientation that gives the operator an intuitive control layout, in other words a logical layout and actuation scheme of the control switches indicative of the movements of the implement and/or particular actuation components.

Figure 2:
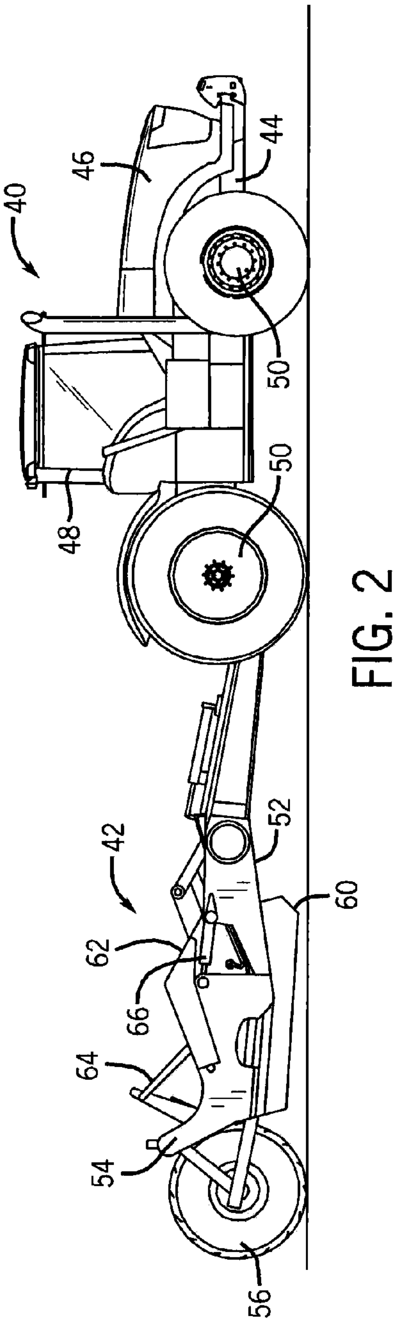
FIG. 2 is a side view of another example work vehicle, in the form of a tractor with a scraper attachment, in which another example of the disclosed control grip may be implemented.

Having described the configuration and general operating principles of the control grip, and the implement control system in which it can be incorporated, one or more example constructions will now be described. FIGS. 1 and 2 illustrate two example work vehicles commonly used in the agriculture, construction and/or forestry industries in which the control grip of this disclosure can be utilized. FIG. 1 depicts an example crawler dozer 20 having a main chassis 22 supporting a prime mover 24 (e.g., diesel engine), an operator cabin 26, and a ground-engaging roller track assembly 28. The dozer chassis 22 also supports a front implement, in the form of a dozer blade 30, and a rear implement, in the form of a ripper 32, which is mounted for articulation via hydraulic cylinders 34 and 35. In particular, the ripper 32 can include one shank, or a set of multiple shanks, 36 each with at least one ripper tooth 38. FIG. 2 shows a tractor 40 towing an implement, in the form of a scraper 42 typically used in the construction industry. The tractor 40 has a main chassis 44 supporting a prime mover 46 (e.g., diesel engine), an operator cabin 48, and a ground-engaging axle wheel assembly 50. The scraper 42 has front 52 and rear 54 frame sections, the rear frame having an aft end supported by ground wheels 56. The scraper 42 also has an apron/gate 60 that projects from the bottom of the rear frame 54 for scraping earth into a bowl 62, which is later emptied by an ejector plate 64. The moving components of the scraper 42 may be actuated hydraulically, including hydraulic cylinders 66.

It should be noted that while FIGS. 1 and 2 depict example work vehicles in which the control grip of the present disclosure can be utilized, the control grip can also be used with any of various other types of existing work vehicles, including many common agricultural, construction and forestry machines. The principles disclosed herein could be incorporated into any powered pedestrian or work vehicle having an implement control system. As such, the terms “work vehicle” and “control” are not to be interpreted as limiting or limited to the illustrated crawler dozer and tractor-scraper train described herein. Moreover, the disclosed control grip may be installed as an original factory component of the vehicle or retrofit to a pre-existing vehicle.

Figure 3:
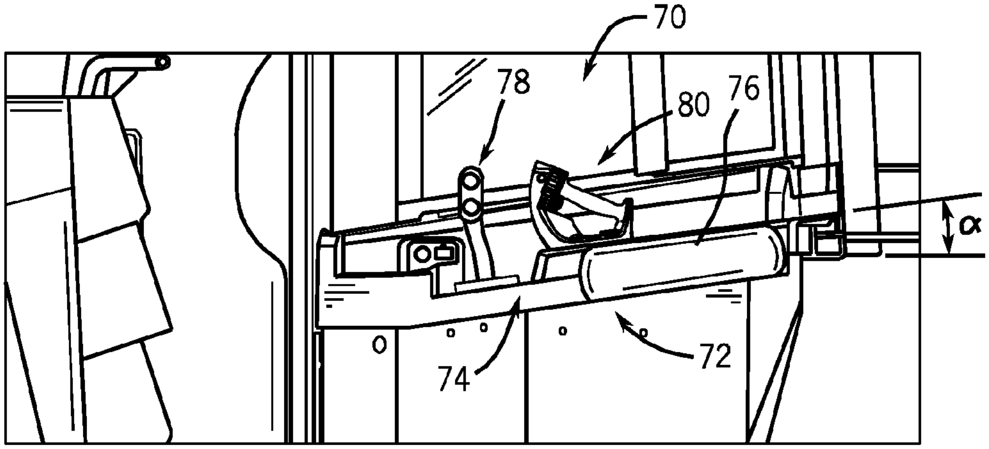
FIG. 3 is partial perspective view of an operator station of the example work vehicle of FIG. 1 with the example control grip mounted to an operator console.

Referring now to FIG. 3, an example operator station 70, such as within the operator cabin 26 or 48 of the dozer 20 or the tractor 40, respectively, is shown. The operator station 70 can include an operator seat 72 and a console 74 located adjacent an armrest 76 of the seat 72. In the example shown, a front implement joystick control 78 and an example control grip 80 are mounted to the console 74. The control grip 80 can be mounted to the console 74 alongside the armrest 76, or otherwise near the operator seat 72 within a comfortable reach of an operator (not shown) sitting in the seat 72. As shown and described in detail below, the control grip 80 can be securely mounted to the console 74 in a rigid connection, for example to a structural frame member of the vehicle (not shown). The illustration in FIG. 3, and the other figures of the drawings, depict a control grip 80 mounted to the right-hand side of the operator seat 72 (from the operator’s perspective) for manipulation by the operator’s right hand. Of course, a left-hand mounting position, and left-hand control grip configuration could be provided by mirroring the components shown in the drawings, and thus the illustrated example is not intended to be limiting in this respect.

Generally, the control grip of the present disclosure includes as basic features a handle member, at least one upright support member, and one or more control switches (detailed below). The control grip may also have a mounting base for securely mounting to the work vehicle. Thus, the handle member could be mounted, with or without a mounting base component, in cantilever fashion by a single support column at one end of the control grip. However, the illustrated example provides a control grip configured to support the handle member on both ends.

Figure 4:
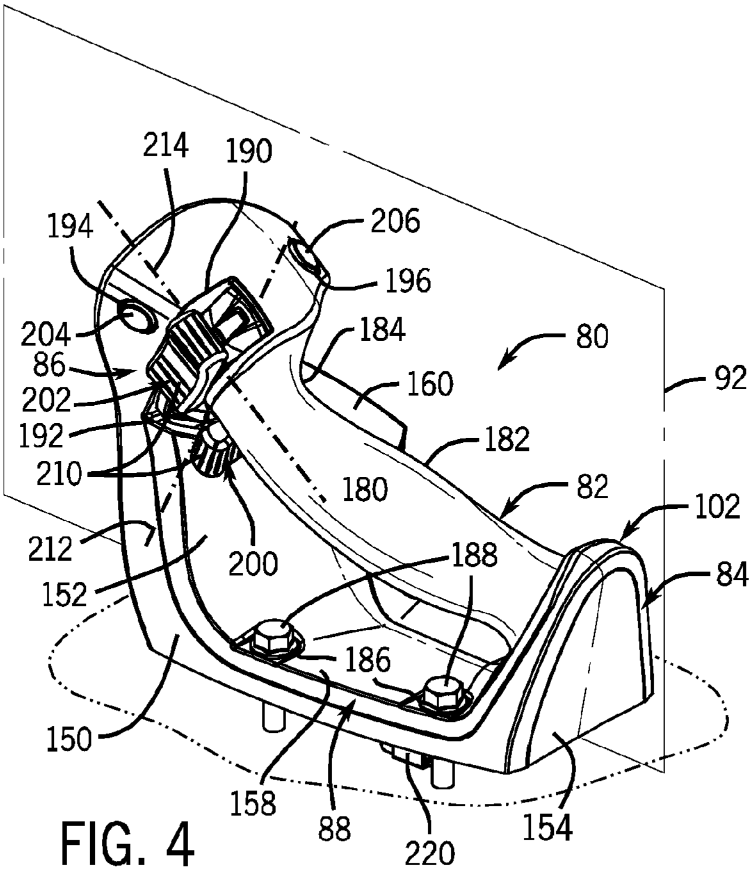
FIG. 4 is a perspective view of the control grip in a two-axis control configuration, such as can be used in the example work vehicle of FIG. 1.
Figure 5:
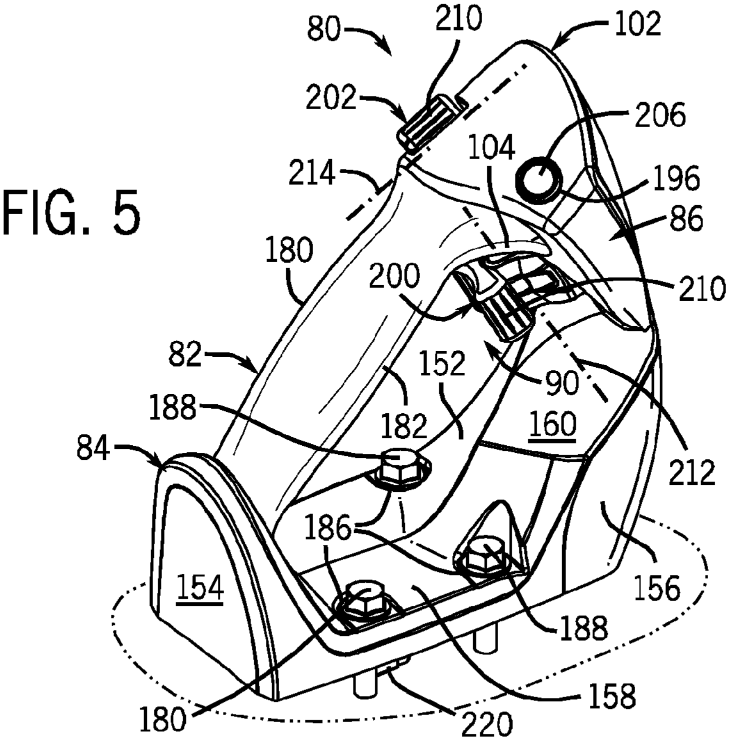
FIG. 5 is another perspective view thereof.
Figure 6:
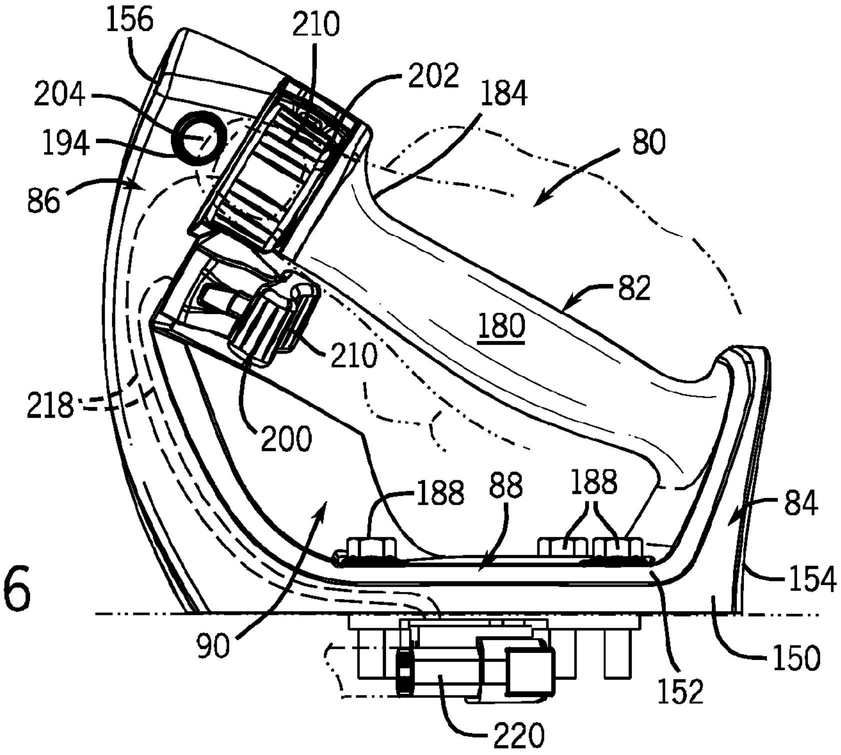
FIG. 6 is a side view thereof.

Specifically, with continued reference to FIGS. 4-6, an example control grip 80 has a handle or grab bar 82 spanning the upper ends of a proximal end upright support 84 and a distal end upright support 86. The lower ends of the proximal 84 and distal 86 upright supports are united by a mounting platform 88. The grab bar 82 spans the upper ends of the upright supports 84, 86 in spaced relation from the mounting platform 88 to provide an open area for finger space 90 therebetween. In the illustrated example, the distal upright support 86 is taller than the proximal upright support 84 such that the grab bar 82 is inclined, or canted upwardly from the proximal to the distal ends of the control grip 80. As shown in FIG. 3, the grab bar 82 can be at angle a from horizontal of about 5-10 degrees, although other angles, such as 0-60 degrees from horizontal, are considered to provide an ergonomic hand position for the operator. It should be noted, however, that the height of each upright support 84, 86 can vary from the illustrated example, including being the same height or providing for a declined, or downwardly canted grab bar angle from proximal to distal ends. Moreover, the height of one or both of the upright supports 84, 86 can be set according to the height of the mounting location relative to the operator seat 72, for example the relative heights of the console 74 and the armrest 76 of the operator seat 72 to provide proper positioning of the control grip 80. In addition, the upright supports 84, 86 can be symmetric or asymmetric with respect to a proximal-distal center plane 92 of the control grip 80. For example, in the illustrated example, the proximal 84 and distal 86 upright supports are offset from one another with respect to the center plane 92. This lateral offset, in conjunction with the inclined and contoured grip of the grab bar 82 (along with a proper lateral and fore-aft mounting location of the control grip 80 relative to the armrest 76 of the operator seat 72) provides a comfortable, ergonomic hand placement for the operator.

Figure 10:
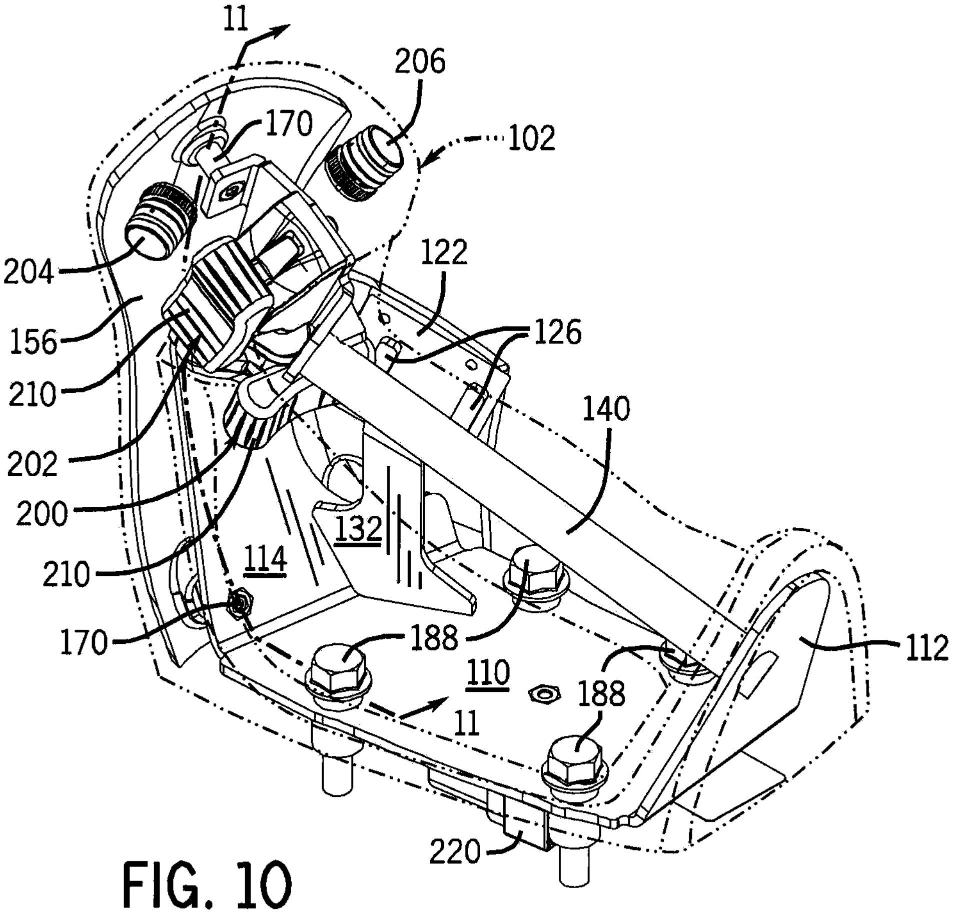
FIG. 10 is another perspective view of the control grip of FIG. 4 with part of an outer body thereof shown in phantom to reveal an internal structural frame.
Figure 11:
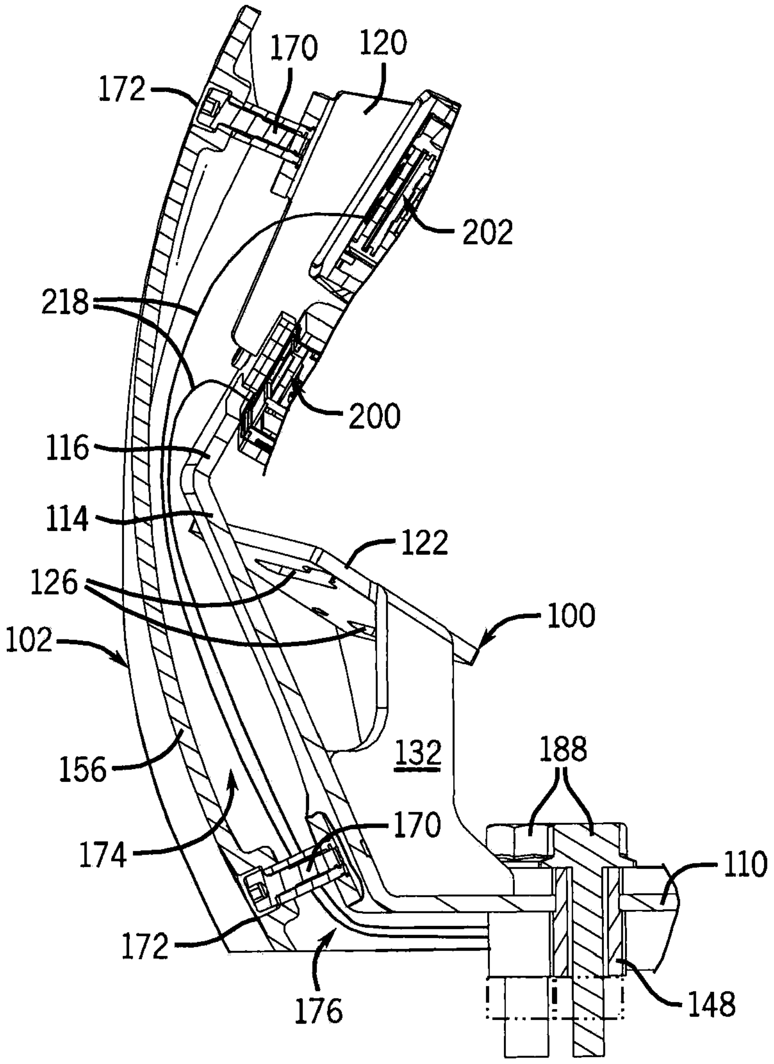
FIG. 11 is a partial side sectional view taken along line 11-11 of FIG. 10.
Figure 12:
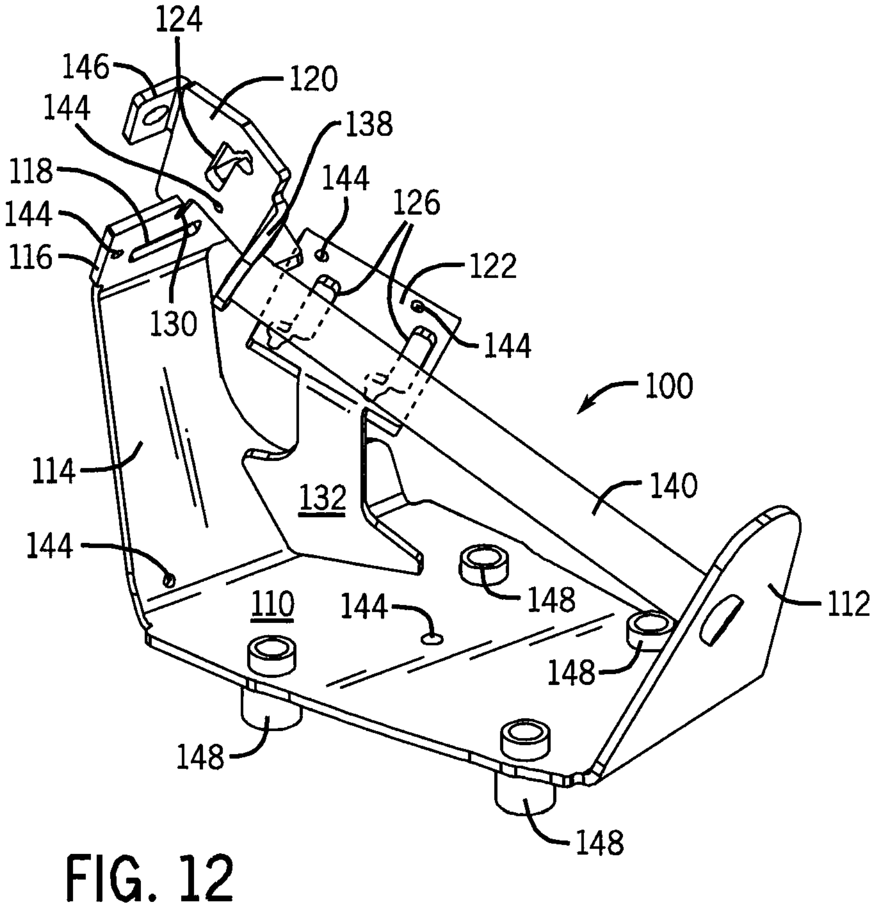
FIG. 12 is a perspective view of the structural frame in isolation.

Referring now also to FIGS. 10-12, the control grip 80 can be a composite structure, including both structural and generally non-structural materials and components. For instance, the example control grip 80 has an internal frame 100 that supports, and is concealed by, an outer housing or body 102. In this case, the frame 100 can be understood as a skeleton core providing the primary structural features of the control grip 80 (e.g., handle mounting support, switch mounting, etc.). The outer body 102 can be understood as providing the outer form, and thus the primary aesthetic and comfort features, of the control grip 80 (e.g., contoured grip, smooth outer surfaces, conceals the frame and other internals, etc.). In keeping with their primary functions, the frame 100 thus can be made of a rigid, structural material, such as a metal plate construction (e.g., steel), and the outer body 102 can be formed of a non-structural material, such as a suitable plastic resin (e.g., polyurethane). The frame 100 and outer body 102 can be joined as an assembly of parts, as described below, or some or all of the outer body 102 can be molded directly onto the frame 100, such as in an insert-molding process. Furthermore, the outer body 102 itself can be of composite construction, made in whole or in part from multiple structural or non-structural materials, including, for example, having a compliant outer skin formed over, such as via an over-molding technique, an inner wall of the outer body 102, especially along the grab bar 82.

With reference to FIGS. 10 and 12, the metal plate construction of the internal frame 100 of the example control grip 80 will now be described. Generally, the internal frame 100 has features that make up the rigid internal core or skeleton of the grab bar 82, upright supports 84, 86 and the mounting platform 88. In particular, the frame 100 has a flat platform plate 110 forming the core of the mounting platform 88 from opposite ends of which upright plates 112 and 114 extend upwardly to form the core of the proximal 84 and distal 86 upright supports, respectively. As shown in FIG. 12, the upright plate 114 extends slightly higher than the upright plate 112. The upright plate 112 has a generally triangular configuration, and the upright plate 114 has a more elongated shape. The upright plates 112, 114 are shown to each form an obtuse angle with the platform plate 110, however, they could be perpendicular or at an acute angle. Additionally, the upright plates 112, 114 may be formed as unitary, bent ends of the platform plate 110, or alternatively may be separate elements that are attached to the platform plate 110 via a suitable connection, such as welding. The upper end of the upright plate 114 forms a first switch mount 116 having mounting apertures, including slot 118. Like the upright plate 114, the first switch mount 116 may be formed as a unitary, bent end of the upright plate 114, or it may be attached to the upright plate 114 by welding or other suitable technique. In the illustrated example, the upright plate 114 and first switch mount 116 form a compound angle with respect to the platform plate 110, first angling away from the platform plate 110 and then back.

The frame 100 of the illustrated example provides two additional switch mounts, including a second switch mount 120 and a third switch mount 122. The second switch mount 120 has mounting apertures, including slot 124, and the third switch mount 122 has mounting apertures, including two slots 126. As shown, the second 120 and third 122 switch mounts can be small plates of the same (or different) material as the platform 110 and upright plates 112, 114. The second switch mount 120 is positioned above, and essentially orthogonal to the first switch mount 116 and can be received in a groove 130 at the upper end of the first switch mount 116. The third switch mount 122 is positioned below and laterally offset from the first 116 and second 120 switch mounts and can be supported by a brace 132 joined to one or both of the platform 110 and upright 114 plates, for example by welding. A flange 138, which may be a bent tab of the second switch mount 120, rigidly couples (e.g., via welding) to the distal end of a hollow- or solid-core cylindrical rod 140, which forms the core of grab bar 82. The rod 140 extends from the flange 138 to the upper end of the proximal upright plate 112, where it is rigidly coupled, again via welding, for example. Due to the height difference between the upright plates, the rod 140 is inclined relative to the platform plate 110. The rod 140 can be aligned askew from the proximal-distal center plane 92 of the control grip 80, such as at an angle placing the distal end of the rod 140 closer to a near lateral side (from the seated operator's perspective) of the control grip 80 than its proximal end. Additionally, various mounting openings, such as tapped openings 144 in the platform 110 and upright plates 114, 116 as well as in a mounting tab 146 of the second switch mount 120, and through openings defined by cylindrical boss apertures 148 in the platform plate 110.

The outer body 102 may have a single-piece, uni-body molded construction, or it may be an assembly of body panels, such as in the illustrated example. Referring to FIGS. 4-6 and 10, the outer body 102 includes a generally U-shaped outer part 150, a generally U-shaped inner part 152, end caps 154 and 156, and covers 158 and 160. The various parts 150-160 of the outer body 102 may be positively joined along mating seams using a suitable technique, such as by adhesive, welding, or a mechanical interlocking connection (e.g., tongue and groove). Alternatively, the peripheral edges of parts 150-160 may simply abut one another. In either case, the outer body 102 is coupled to the frame 100 by any suitable connection technique so that, at least at the grab bar 82 and the switch locations, the outer body 102 is rigidly braced from within and can be rigidly mounted to the vehicle either by mounting hardware directly connected to the outer body 102 or indirectly by mounting hardware connected only to the frame 100.

For example, in the control grip 80 illustrated in the drawings, the outer body 102 may be mounted to the frame 100 using threaded fasteners 170 which pass through associated openings 172 in the outer body 102 and thread into the tapped openings 144 in the frame 100, for example at the distal upright support 86, as shown in FIGS. 10 and 11. One or more similar connections can be provided at the proximal upright support 84 and/or the mounting platform 88. The mounting connections can allow for the outer body 102 to be otherwise spaced from the frame 100, such that one or more hollow cavities may be formed between the frame 100 and the outer body 102, including cavity 174 at the distal upright support 84 as well as cavity 176 at the mounting platform 88. Cavities 174, 176 may provide space to accommodate wiring or other conduit or circuitry. It should be noted that if the outer body was formed as a casting directly on the frame, or if the frame and outer body construction was instead replaced by a unitary, solid core construction, then various routing passages and other recesses or cavities can be formed into the control grip either during or after the molding or casting process using known techniques (e.g., insert molding or casting or subsequent boring and machining operations).

The outer body 102 can also include a separate handle body, for example that is split in one or two places along its length, which fits over the rod 140 of the frame 100, in which case the handle body may define the outer surface of the grab bar 82 and have the same material construction as other parts of the outer body 102. Alternatively, the outer body 102 may include an outer grip skin (not shown) made of a different material, such as a compliant thermo-resin, which can be joined to the handle body using a suitable technique, such as an over-molding process. The compliant grip skin, for example, can improve the tactile qualities of the control grip 82 in terms of operator comfort and reducing slippage. The grab bar 82 can also be formed initially as a composite structure, as in the illustrated embodiment, in which the material forming the outer grip surface is formed directly onto the rod 140, either before or after assembled to the frame 100, such as by using a suitable insert-molding technique. Again, a somewhat softer, compliant material may be used. Regardless of the particular construction or manufacturing process, the grab bar 82 should be formed without spacing between the rod 140 and the grip surface to allow forces generated by the operator's hand to be transferred efficiently to the frame 100. Additionally, the grip surface of the grab bar 82 can be contoured to provide an ergonomic and comfortable handle for the operator's hand. For example, rather than a simple cylinder, the grab bar 82 can define a complex contour, including one or more inflection points. More specifically, the grab bar 82 can have a generally convex palm rest 180 along its length at the near side of the control grip 80, while at the far side the grab bar 82 may a convex central area 182 with concave pistol grip area 184 on its distal side providing a smooth transition to the distal upright support 86.

At the mounting platform 88 the outer body 102 may also have mounting openings 186 aligned with the mounting aperture bosses 148, which receive mounting bolts 188 that securely mount to a structural member or other support surface, such as at the console 74 within the operator station 70 of the work vehicle. The outer body 102 can also be formed with recesses associated with the mounting openings 186 to accommodate the heads of the bolts 188 as well as a tool for tightening and loosening the bolts 188. The bolts 188 in the illustrated example thus mount the entire control grip 80, by directly engaging both the frame 100 and the outer body 102, to the vehicle.

The outer body 102 can also define pockets for the various controls of the control grip 80. For example, in the illustrated example shown in FIGS. 4-6, the outer body 102 defines two switch pockets 190, 192 and two button pockets 194, 196 at the distal end of the control grip 82, specifically in part 152 of the outer body 102 at the distal upright support 86. The switch pockets 190, 192 are aligned with, and open to, the first 116 and second 120 switch mounts of the frame 100. A first control switch 200 may thus be mounted to the first switch mount 116, and a second control switch 202 may be mounted to the second switch mount 120. Button controls 204, 206 can be mounted within respective button pockets 194 and 196. In the illustrated example, the button controls 204, 206 are mounted directly to the outer body 102, specifically part 152, however, they could also be mounted to the frame 100, for example, at additional switch mounts.

As shown, the first 200 and second 202 control switches, as well as button controls 204 and 206, each have a compact package and are arranged in close proximity to one another at the distal end of the control grip 82. The close grouping puts all the controls within close reach of the operator's hand (see FIG. 4) such that all of them can be manipulated, individually or two or more simultaneously, while the operator's hand is supported by the grab bar 82, and further while at least one, and up to four, fingers of that hand are grasping the grab bar 82. In addition to the close grouping, both the type and orientation of the controls further facilitate maintaining a firm grip of the grab bar 82 during manipulation of the controls as well as an intuitive feel for the operator, as described below.

More specifically, in the illustrated example the control switches 200, 202 may be rocker-type paddle switches having electrical and mechanical components in a compact form-factor. The control switches 200 and 202 can have a pivotally mounted paddle lever 210, which can be configured with a concave, corrugated or ribbed surface for added comfort and to inhibit slipping during operation. As shown in FIGS. 4 and 5, the paddle levers 210 can be pivoted about respective first 212 and second 214 axes in both directions (e.g., clockwise and counter-clockwise) and can be configured (e.g., by spring or other biasing member) to return to a centered position. While a more arbitrary arrangement is possible, the first 212 and second 214 pivot axes can be aligned with, or oriented to approximate the reference axes defining the ranges of motion of the implement being controlled, or its actuating components (e.g., hydraulic cylinders). For example, the first pivot axis 212 may be vertical, or it may extend generally upright to approximate the reference axis about which the implement may move when swinging in the direction between the lateral sides of the work vehicle. The second pivot axis 214 then may be horizontal, or it may extend in a generally lateral plane either in a fore-aft direction or a lateral side-to-side direction, of the vehicle. Further, these pivot axes 212, 214 may be transposed to one or more off-plumb reference planes, such as to follow an angled mounting platform, or in the case of the illustrate example, the inclination of the grab bar 82. Thus, in the example control grip 80 the pivot axes 212, 214 can replicate the generally vertical and horizontal reference axes of movement of the implement (despite not being actually aligned vertically and horizontally) by their generally upright and lateral axial orientations as well as by being generally perpendicular to one another. As such, the control switches 200 and 202, and associated control software and hardware, can be configured such that switch manipulation is correlated to the movements of the implement in an intuitive manner for the operator. By way of example, in the first control switch 200, depressing the near end (left end from the seated operator's perspective) of the paddle lever 210 can correspond to rightward movement of the implement (e.g., pitch out) and depressing the far (right) end of the paddle lever 210 can correspond to leftward movement of the implement (e.g., pitch in). Similarly, depressing the upper end of the paddle lever 210 of the second control switch 202 can correspond to vertically upward movement of the implement and depressing the lower end of the paddle lever 210 can correspond to vertically downward movement.

Figure 7A:
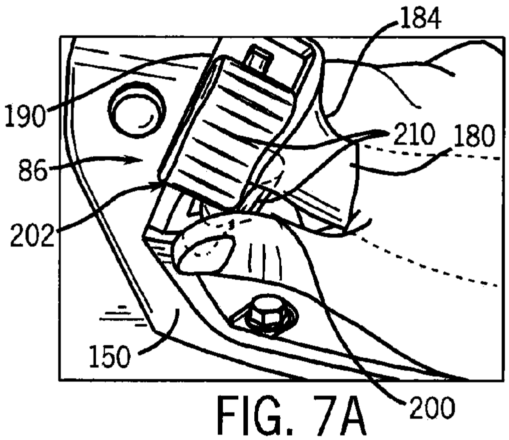
FIGS. 7A and 7B are close-up views showing an example thumb-only manipulation of a lower control switch of the control grip of FIG. 4.
Figure 7B:
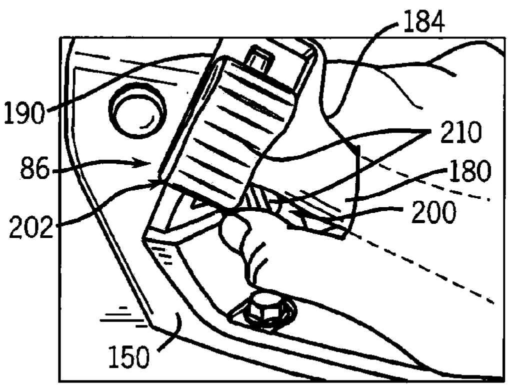
Figure 8A:
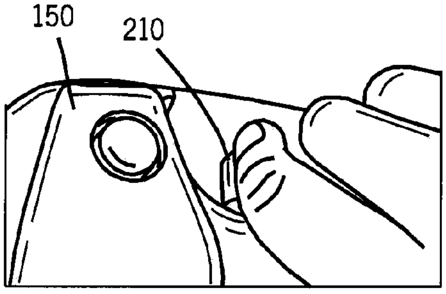
FIGS. 8A and 8B are close-up views showing an example finger-only manipulation of the lower control switch.
Figure 8B:
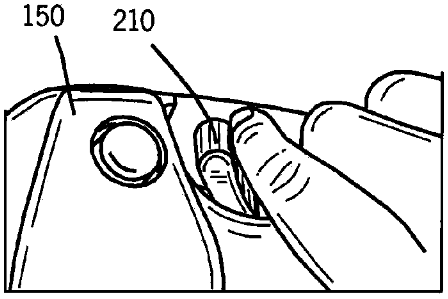
Figure 9:
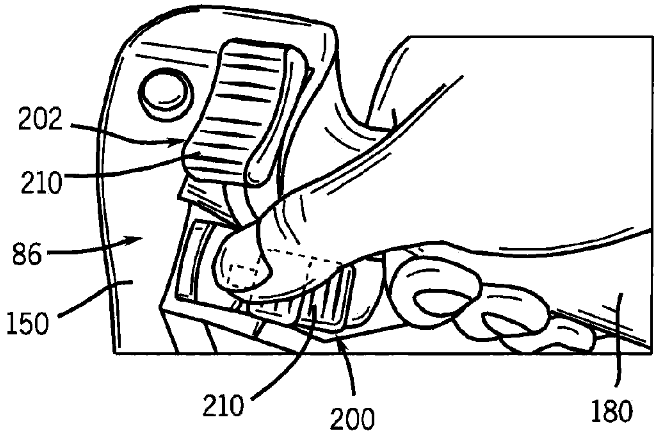
FIG. 9 is a close-up view showing an example thumb-finger pinching technique for manipulating the lower control switch.

In addition to the intuitive feel, as mentioned, the example switch arrangement (including button controls 204, 206) allows the operator to maintain a firm grasp of the grab bar 82 at all times during operation of the vehicle, including when manipulating one or more of the controls, either separately or simultaneously. As one example, the operator's thumb may manipulate the second control switch 202 and the first control switch 200 can be manipulated using one of three distinct techniques, namely a push-pull thumb operation, as shown in FIGS. 7A-7B, a push-pull finger operation, as shown in FIGS. 8A-8B, and a thumb-finger pinch operation, as shown in FIG. 9. More specifically, either the operator's thumb or finger (e.g., index or middle finger) may manipulate the first control switch 200, while the remaining fingers maintain a grip on the grab bar 82. As illustrated, the first control switch 200 can be manipulated by applying the operator's thumb to the near end of the paddle lever 210, that is, pushing on its front portion to pivot it in one direction (FIG. 7A), and then hooking onto its back portion to pivot it in the opposite direction (FIG. 7B). Alternatively, the first control switch 200 can be manipulated by applying the operator's index or middle finger only to the far end of the paddle lever 210, that is, pushing on its front portion to pivot it in one direction (FIG. 8A), and then hooking onto its back portion to pivot it in the opposite direction (FIG. 8B). Still further, the first control switch 200 may be manipulated by pinching the paddle lever 210 between the operator's thumb and index finger, for example by applying the operator's thumb to the front or rear of the near end of the paddle lever 210 and the index finger to the front or rear of the far end of the paddle lever 210 (FIG. 9). Thus, the control grip 80 affords the operator the option of different techniques for manipulating the control switch 200, which further improves the user-experience and the operator's ability to obtain and maintain a firm, multi-finger grip on the grab bar 82. It should be noted that proper sizing and arrangement of control switches relative to the grab bar may allow for such varied manipulation techniques to be applied to additional control switches, while maintaining a multi-finger grip.

Additionally, the positioning of the control switches 200, 202 (and button controls 204, 206) helps to avoid inadvertent actuation of the switches 200, 202 (and button controls 204, 206), and thus unintended movement of the implement. For example, if the operator's thumb is engaged with the second control switch 202, but slips off momentarily due to the vehicle encountering a sudden change in terrain, the perpendicular relative orientation of the first control switch 200 inhibits the operator's thumb from actuating the first control switch 200.

Although not shown in the drawings, it will be understood that the control switches 200, 202 (and button controls 204, 206) are operatively coupled to the electronic and hydraulic control system of the work vehicle. Electrical conduit, flexible bus, or other wiring 218, routed through the cavities 174, 176 between the frame 100 and outer body 102 in the distal upright support 86 and mounting platform 88, can couple the electrical contacts of the controls 200-206 to onboard control and interface circuitry 220 mounted to the underside of the platform plate 110, as shown in FIGS. 10 and 11. For example, the onboard circuitry 220 may include a suitable pin connector for interfacing with an electronic control unit (not shown), which can have suitable processor and memory components for executing control software managing user input and output control signals. The controller may be a dedicated controller, or a shared controller of the vehicle used to control other vehicle systems. In either case, the controller utilized is operatively coupled to the implement actuation system, such as a vehicle hydraulic system having one or more hydraulic cylinders, for example, hydraulic cylinders 34, 35 in the dozer 20 shown in FIG. 1. As will be understood, the controller generates actuation signals, or processes actuation signals generated by the control switches, buttons and other circuit components, to drive one or more actuators, such as hydraulic control valves controlling fluid pressure from a hydraulic pump to the hydraulic cylinders, and thereby control actuation of the implement according to operator input to the control grip 80.

The control switches 200, 202 (and the button controls 204, 206), along with the control hardware and software, may also be configured to control the implement in proportion to the operator input. In other words, the control switches 200, 202 (and button controls 204, 206) can effect a corresponding change in position of the implement in direct proportion to the input actuation, such as in terms of duration, pressure or displacement of the control switches 200, 202 (and button controls 204, 206). As one example, upon actuation of one of the control switches 200, 202, the control system can generate an actuation signal processed according to applicable control logic to correlate the angle through which the paddle lever 210 is pivoted about its associated pivot axis to a corresponding range of motion of the implement. In this case, the angular displacement of the control switches 200, 202 may effect proportional control actuation signals to position the implement in each range of motion.

With continued reference to FIGS. 4-6, and also FIG. 1, an example operation of the dual-axis control grip 80 to control the ripper 32 implement of the dozer 20 will now be described. As mentioned, the control of the control grip 80 can be operatively coupled to the hydraulic system of the vehicle, here dozer 20. Specifically, the control system is configured such that the first control switch 200 controls a first range of motion of the ripper 32, such as the pitch or fore-aft position of the ripper shank(s) 36, and the second control switch 202 controls a second range of motion, such as the height of the ripper shank(s) 36. In the centered position of each control switch 200, 202, the control system is configured to maintain the current position of the ripper 32 by either not generating an actuation signal or by generating a null value neutral signal. To raise the ripper 32, the operator can use his or her thumb to press on the paddle lever 210 of the second control switch 202 to pivot its upper end about the pivot axis 214 (in a clockwise rotational direction from the perspective of the seated operator). The generated actuation signal is used, for example, to control a hydraulic valve that controls hydraulic fluid pressure to retract the hydraulic cylinders 35, and thereby raise the ripper 32. To lower the ripper 32, the operator can apply his or her thumb against the lower end of the paddle lever 210 of the second control switch 202 to pivot it about the pivot axis 214 in the opposite (counter-clockwise). A corresponding actuation signal is generated that extends the hydraulic cylinders 35, and thereby lower the ripper 32, such as to engage the ripper teeth 38 with the ground. To change the pitch of the ripper 32, that is the fore-aft position of the ripper shank(s) 36, the operator can use the first control switch 200. For example, the operator can pivot the paddle lever 210 about the pivot axis 212 (in a clockwise rotational direction from the perspective of the seated operator) so that its near (left) end moves towards the distal upright support 86. This can be done either by pressing the operator's thumb against the front of the near end of the paddle lever 210, or by hooking the operator's index finger behind the far (right) end and using a trigger-pulling action to pivot it about the pivot axis 212. The corresponding actuation signal causes the hydraulic cylinders 34 to extend and thus pitch the shank(s) 36 to move the teeth 28 toward from the dozer 20. The ripper 32 can be moved in the opposite direction by pivoting the far (right) end of the paddle lever 210 about the pivot axis 212 in the opposite direction (counter-clockwise) towards the distal upright support 86. In this way, the operator intuitively raises the implement by pushing up, lowers it by pushing down, pitches it away from the vehicle by pushing away and pitches it toward the vehicle by pulling.

Additionally, the control buttons 204, 206 can be used to perform ancillary operations of the implement. For instance, in the dozer and ripper example, the control button 204 may be a normally open, momentary switch, and the control system may be configured such that actuating the control button 204 effects an actuation signal to control valves to both hydraulic cylinders 34 and 35 to move the ripper 32 to a stowed position. The control button 204 can be located on the distal upright support 86 toward the near side of the control grip 80 so that it may be manipulated by the operator's thumb. The control button 206 may be mounted near the control button 204, but at the far side of the control grip 80 such that it can readily be manipulated by the operator's index finger. The control button 206 may also be a normally open, momentary switch, and the control system can be configured to process the actuation signals from the control button 206 to drive an actuator (e.g. solenoid) to dislocate a coupling pin (not shown) of the ripper 32.

Figure 13:
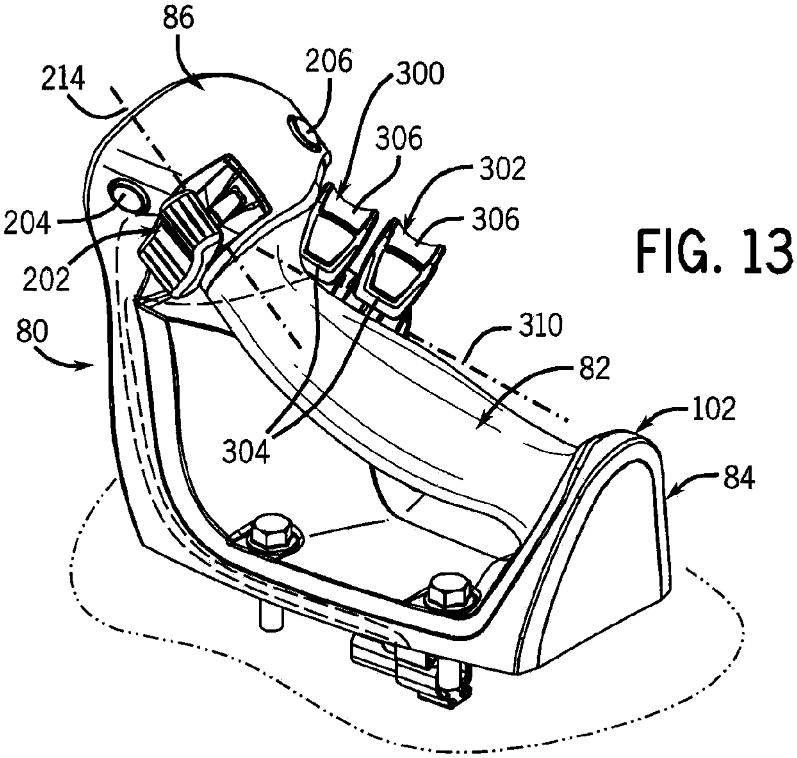
FIG. 13 is a perspective view of the control grip in a three-axis control configuration, such as can be used in the example work vehicle of FIG. 2.
Figure 14:
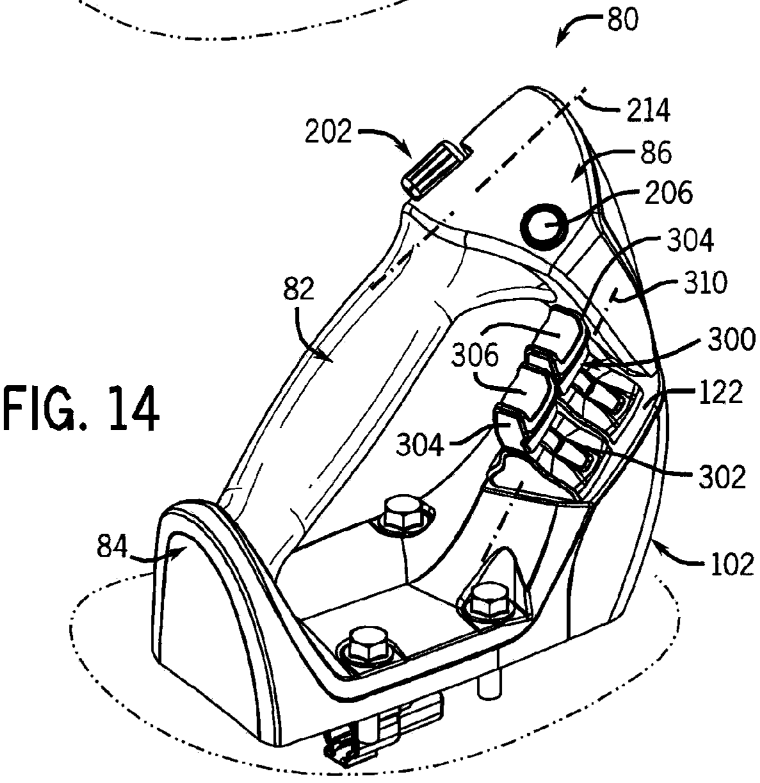
FIG. 14 is another perspective view thereof.
Figure 15:
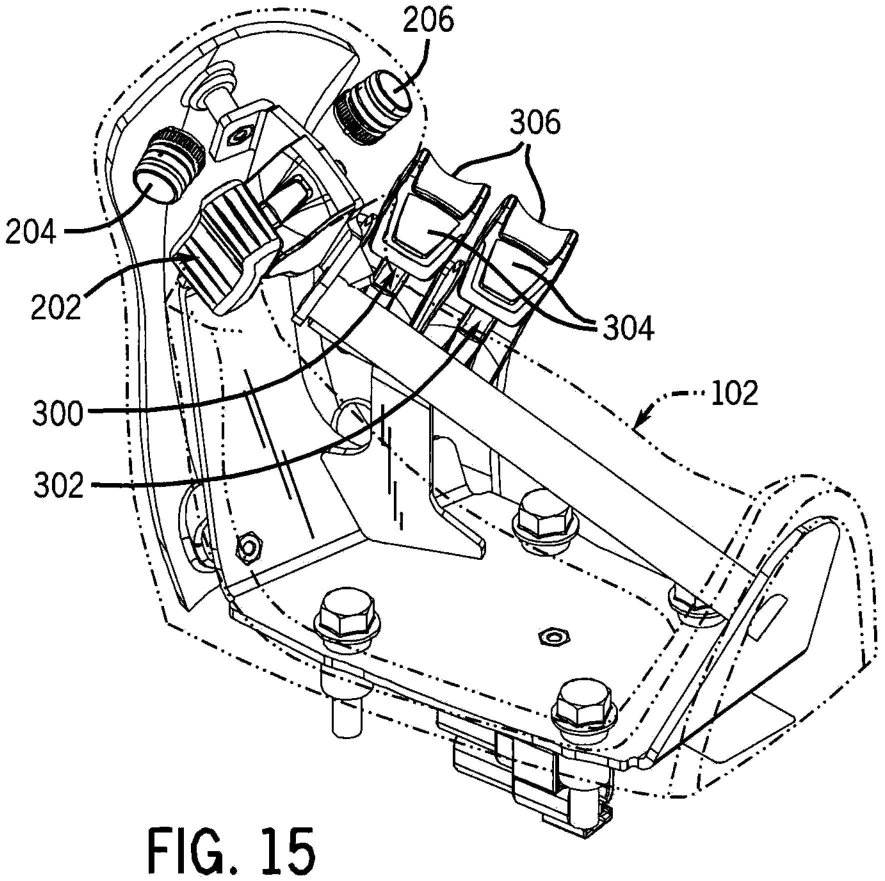
FIG. 15 is another perspective view of the control grip of FIG. 13 with part of an outer body thereof shown in phantom to reveal an internal structural frame.

With reference now to FIGS. 13-15, another configuration of the control grip 80 provides for three-axis control. In this configuration, the control grip 80 generally includes the same components as described above, including the frame 100 and the outer body 102, which together combine to define the proximal 84 and distal 86 upright supports that suspend the grab bar 82 above the mounting platform 88. This embodiment of the control grip 80 also includes the control switch 202 and control buttons 204, 206 mounted in the same locations at the distal upright support 86. However, the control switch 200 can be understood to be either relocated, or omitted and replaced by control switches 300 and 302. Control switches 300, 302 can be the same as control switches 202, or as shown, control switches 300, 302 can be compact fingertip joystick switches, which have a generally upright pivotal lever 304 with an upper grip area 306. Cover 160 of the outer body 102 is removed to access the third switch mount 122 to which the control switches 300, 302 are mounted. Suitable electrical connections connect the control switches 300, 302 to the control system.

As described above, control switch 202 is mounted to the switch mount 120 and configured to pivot about pivot axis 214. Control switches 300, 302 are mounted side by side to the switch mount 122 and oriented and configured to pivot about a common additional pivot axis 310. The switch mount 120 is inclined, such that the pivot axis 310 is generally parallel to the grab bar 82, which aids in aligning the operator's fingers with the control switches 300, 302.

Due to the close grouping and orienting of the control switches 202, 300, 302 the operator is able to manipulate all three switches, while still maintaining a firm grip on the grab bar 82. As one non-limiting example, the operator's thumb may manipulate control switch 202, the operator's index finger may manipulate control switch 300, and the operator's middle finger may manipulate control switch 302, while the remaining fingers (i.e., the operator's ring finger and pinky finger) grip the grab bar 82. However, both control switches 300, 302 can be operated by either the index or middle finger separately, or simultaneous by placing the index or middle finger between and spanning the control switches 300, 302.

This embodiment of the control grip can control the scraper 42, for example, shown attached to the tractor 40 in FIG. 2. Control switch 202 may be operatively connected to the scraper 42 to control the size of the bowl 62. Control switches 300, 302 may also be operatively connected to the scraper 42 to control its two additional ranges of motion, namely the position of the apron/gate 60 and translation of the ejector 64.

More specifically, the operator's thumb, for example, can press the upper end and lower end of control switch 202 to pivot its paddle lever 210 about the pivot axis 214 in either direction (i.e., clockwise/counter-clockwise), such as up to raise and down to lower. The corresponding actuation signal causes hydraulic cylinders to extend and retract to vary the height of the bowl. The operator's index and/or middle fingers, for example, can pull and push the levers of control switches 300 and 302 toward and away from the grab bar 82 to pivot about the pivot axis 310 in clockwise and counter-clockwise directions. The generated actuation signals cause the hydraulic cylinders, including hydraulic cylinders 66, to extend and retract to translate the ejector 64 either towards or away from the rear frame 54, such as when empting the bowl 62, and/or to raise or lower the blade 60, such as to vary the depth of the scrape. For example, pushing (away from the operator) on the lever of the control switch 300 can drop the apron/gate, and pulling on the lever of control switch 300 can raise it up. Pushing on the lever of control switch 302 can move the ejector 64 to empty the bowl 62, and pulling on it can return the ejector 64. Furthermore, the button controls 204, 206 may be used to stow and disconnect the scraper 42.

Thus, in a manner similar to that described above, this three-axis configuration of the control grip provides similar intuitive control of the implement while simultaneously allowing the operator to maintain a firm grip of the grab bar.

The above discussion describes at least two configurations of the disclosed control grip. However, additional configurations are envisioned. For example, a single-axis configuration may be possible in which the control grip has only a single control switch, such as control switch 200. Alternatively, the control grip may have all four control switches 200, 202, 300, 302 described above. There may only be a single forward finger tip joystick control switch, such as control switch 300, or there may be one or more additional finger tip joystick control switches, such as a group of three, four or more. For example, there could be a side by side grouping of three finger tip joystick control switches, which could be manipulated by either or both of the operator's index or middle fingers (e.g., the index finger manipulating control switch 300 and/or 302 and the middle finger manipulating control switch 302 and/or a third switch (not shown) or one finger manipulating two adjacent switches simultaneously). Similarly, more or less button controls may be employed. Moreover, the particular configurations of the control switches could vary from the button, paddle lever and finger tip joystick configurations disclosed. For example, button control 206 could be a proportional roller control. Still further, one or more control switches or buttons, of any configuration, could be mounted to the proximal upright and/or the base.

Thus, the description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

Also, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, any words of orientation, such as various forms of "left," "right," "up," "down," "top," "bottom," "above," and "below," used herein are for the purpose of describing particular embodiments only and are not intended to be limiting of the disclosure.

Accordingly, various embodiments and implementations other than those explicitly described are within the scope of the following claims.

What is claimed is:

1. A control grip for controlling the operation of an implement attached to a work vehicle, the control grip comprising:

a grab bar extending between a proximal end of the control grip and a distal end of the control grip, the grab bar being configured to be grasped by a human hand;

a base having at least one upright support at at least one of the proximal and distal ends of the control grip so as to support the grab bar in spaced relation to a mounting surface to which the base is mounted;

a first control switch connected to at least one of the grab bar and the upright support at the distal end of the control grip; and a second control switch mounted to at least one of the grab bar and the upright support at the distal end of the control grip, the second control switch being mounted in an orientation different from the first control switch;

wherein the first control switch pivots about a first pivot axis in two opposite directions and the second control switch pivots about a second pivot axis in two opposite directions, the second pivot axis extending perpendicular to the first pivot axis.

2. The control grip of claim 1, wherein the base includes a pair of upright supports spaced apart and extending from a mounting platform, the upright supports supporting the grab bar at the proximal and distal ends of the control grip.

3. The control grip of claim 1, wherein the first control switch is configured such that pivoting about the first pivot axis in a first direction effects an actuation signal for moving the implement in one direction of a first range of motion and pivoting about the first pivot axis in a second direction effects an actuation signal for moving the implement in an opposite direction of the first range of motion; and wherein the second control switch is configured such that pivoting about the second pivot axis in a third direction effects an actuation signal for moving the implement in one direction of a second range of motion and pivoting about the second pivot axis in a fourth direction effects an actuation signal for moving the implement in an opposite direction of the second range of motion.

4. The control grip of claim 3, wherein the actuation signals are proportional to pivot angles about the respective first and second pivot axes.

5. The control grip of claim 3, further including a third control switch connected to at least one of the grab bar and the upright support at the distal end of the control grip.

6. The control grip of claim 5, wherein the second and third control switches are disposed to pivot about the second pivot axis.

7. The control grip of claim 6, wherein the third control switch is configured such that pivoting about the second pivot axis in the third direction effects an actuation signal for moving the implement in one direction of a third range of motion and pivoting about the second pivot axis in the fourth direction effects an actuation signal for moving the implement in an opposite direction of the third range of motion.

8. The control grip of claim 1, wherein the grab bar and the base include a rigid support frame and an outer body mounted to the support frame.

9. The control grip of claim 8, wherein the support frame includes at least one switch mount to which the first and second control switches are mounted.

10. A control grip for controlling the operation of an implement attached to a work vehicle, the control grip comprising:

a rigid support frame defining a mounting platform and spaced apart uprights spanned by a grab bar spaced above the mounting platform and supported at opposite ends by the uprights, the support frame including at least one switch mount located at one of the uprights;

first and second control switches mounted to the at least one switch mount in different orientations; and an outer body mounted to the support frame at least along the grab bar and configured to be grasped by a human hand;

wherein the support frame is at least in part of metal plate construction in which the uprights are at least in part formed as bent ends of the mounting platform.

11. The control grip of claim 10, wherein the support frame includes at least two switch mounts, the first control switch mounted to a first of the switch mounts and the second control switch mounted to a second of the switch mounts.

12. The control grip of claim 10, wherein the first control switch pivots about a first pivot axis in two opposite directions and the second control switch pivots about a second pivot axis in two opposite directions, the second pivot axis extending in a reference plane perpendicular to a reference plane containing the first pivot axis;

wherein the first control switch is configured such that pivoting about the first pivot axis in a first direction effects an actuation signal for moving the implement in one direction of a first range of motion and pivoting about the first pivot axis in a second direction effects an actuation signal for moving the implement in an opposite direction of the first range of motion; and wherein the second control switch is configured such that pivoting about the second pivot axis in a third direction effects an actuation signal for moving the implement in one direction of a second range of motion and pivoting about the second pivot axis in a fourth direction effects an actuation signal for moving the implement in an opposite direction of the second range of motion.

13. The control grip of claim 12, wherein the actuation signals are proportional to pivot angles about the respective first and second pivot axes.

14. The control grip of claim 12, further including a third control switch, wherein the support frame includes a third switch mount to which the second and third control switches are mounted and arranged to pivot about the second pivot axis; and wherein the third control switch is configured such that pivoting about the second pivot axis in the third direction effects an actuation signal for moving the implement in one direction of a third range of motion and pivoting about the second pivot axis in the fourth direction effects an actuation signal for moving the implement in an opposite direction of the third range of motion.

15. A control grip for controlling the operation of an implement attached to a work vehicle and movable in at least first and second ranges of movement, the control grip comprising:

a base having a mounting platform and a pair of proximal and distal upright supports;

a grab bar extending between the proximal and distal upright supports and spaced from the mounting platform;

a first switch lever connected to the distal end upright support spaced from the mounting platform and pivotal about a first pivot axis in two opposite directions; and a second switch lever connected to the distal end upright support spaced from the mounting platform and pivotal about a second pivot axis in two opposite directions, the second pivot axis extending in a reference plane perpendicular to a reference plane containing the first pivot axis;

wherein pivoting the first switch lever about the first pivot axis in a first direction is configured to move the implement in one direction of the first range of motion and pivoting the first switch lever about the first pivot axis in a second direction is configured to move the implement in an opposite direction of the first range of motion; and wherein pivoting the second switch lever about the second pivot axis in a third direction is configured to move the implement in one direction of the second range of motion and pivoting the second switch lever about the second pivot axis in a fourth direction is configured to move the implement in an opposite direction of the second range of motion.

16. The control grip of claim 15, wherein the base and the grab bar include a rigid support frame and an outer body mounted to the support frame.

17. The control grip of claim 16, wherein the support frame includes at least one switch mount to which the first and second control switches are mounted.

18. The control grip of claim 15, further including a third control switch connected to the distal end upright support, wherein the second and third control switches are disposed to pivot about the second pivot axis.

* * * * *